United States Patent [19]

Schmidt

[11] 4,319,071

[45] Mar. 9, 1982

[54] WATERPROOF MULTI-PAIR TELEPHONE CABLE WITH IMPROVED FILLING COMPOUND

[75] Inventor: Gertraud A. Schmidt, Red Bank, N.J.

[73] Assignee: GK Technologies, Incorporated, Greenwich, Conn.

[21] Appl. No.: 121,724

[22] Filed: Mar. 13, 1980

[51] Int. Cl.³ .......................... H02G 15/20; H01B 3/30

[52] U.S. Cl. .......................... 174/23 C; 156/48; 174/110 PM; 252/570; 585/6.6; 523/173

[58] Field of Search ............ 174/23 C, 23 R, 110 PM, 174/116; 156/48; 252/63, 64

[56] References Cited

U.S. PATENT DOCUMENTS

| | | | |
|---|---|---|---|
| 3,775,548 | 11/1973 | Zinser, Jr. et al. | 174/23 C |
| 3,856,980 | 12/1974 | Puckowski et al. | 174/23 C |
| 3,893,961 | 7/1975 | Walton et al. | 174/23 C X |
| 4,105,619 | 8/1978 | Kaufman | 174/23 C |
| 4,218,577 | 8/1980 | Bahder et al. | 174/23 C |

*Primary Examiner*—Arthur T. Grimley
*Attorney, Agent, or Firm*—Hopgood, Calimafde, Kalil, Blaustein & Judlowe

[57] ABSTRACT

This specification relates to a communication cable and method of making it, particularly where the cable includes a high pair count with small conductors so that the filling compound can be made to permeate to the center of the cable without having the filling compound become too viscous to reach the center of the cable when filled by the liquid filling process. The filling compound does not drip at temperatures up to 90° C. From five to ten parts by weight are used of a polyethylene compound as one ingredient of the filler material. The major ingredient of the filler is a paraffinic oil which constitutes 100 parts of the filler compound. Other important considerations are to formulate the compound so that it will not permeate into the cells of the foam skin or all foam insulation.

10 Claims, 2 Drawing Figures

WATERPROOF MULTI-PAIR TELEPHONE CABLE WITH IMPROVED FILLING COMPOUND

PRIOR ART

There are numerous prior patents on filling compounds for communication cable. The pending application of Paul F. Thompson, Ser. No. 059,221, filed July 20, 1979, obtains some of the objectives of this specification but does not have as good penetration for high count cables and is also not suitable for the liquid filling process because it solidifies too quickly on the surfaces of the core elements.

BACKGROUND AND SUMMARY OF INVENTION

The filling compound of this invention is for use in communication cables and has been developed with a solidification temperature low enough so that high pair count small conductor cores can be filled fully with the liquid filling process. The soft and pliable filling compound will not drip at temperatures up to 90°. The addition of from 5 to 10 or more parts by weight of polyethylene compound to the base material provides the desired characteristics for the filling compound.

The base material is a paraffinic type oil having a Saybolt Universal viscosity of approximately 2500–3500 seconds at 37.8° C., the paraffinic oil comprising 100 parts of the filler material.

Another important consideration in the formulation of the filler compound is to avoid having it permeate into the cells of foam skin or all foam insulation. This characteristic was obtained by selecting the specific high viscosity base oil and by increasing the surface tension of the compound with the addition of 1 to 2 parts or more of butyl rubber, or similar material. The new filling compound reduces the swelling of the insulation and less extraction of copper inhibitor and antioxidants thereby increasing the life of the insulation in the pedestal environment. The additive for increasing surface tension provides the desired tackiness and good adhesion of the filler material to the cable components.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
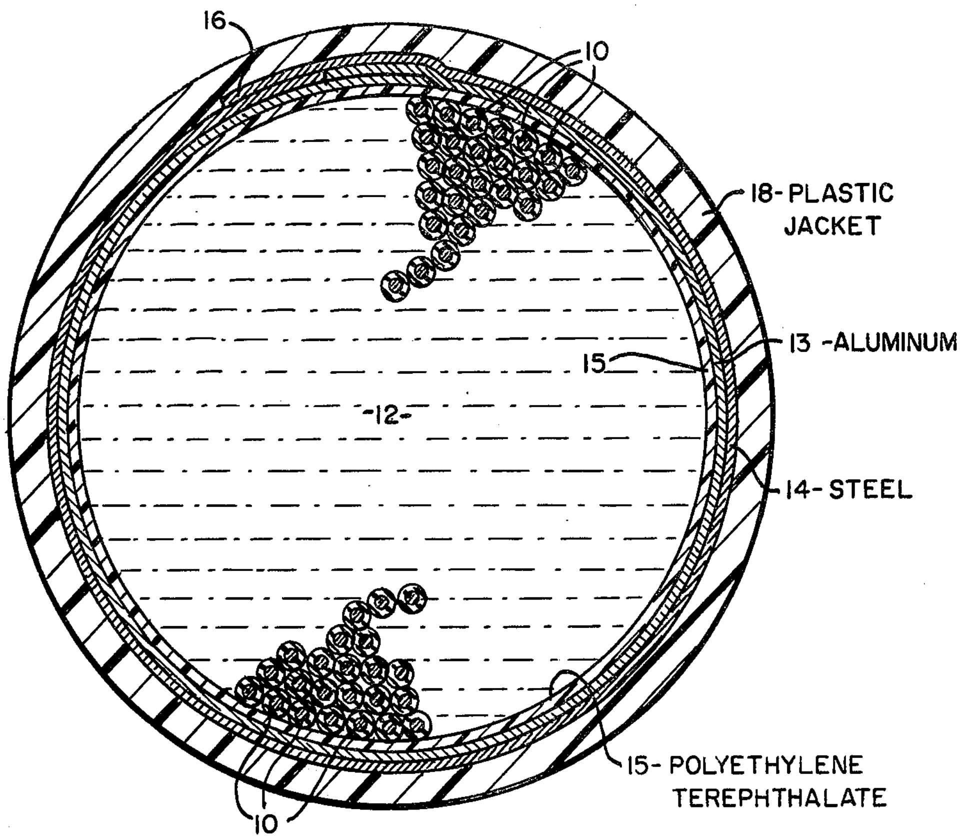
FIG. 1 is a sectional view through a telephone cable embodying this invention.

A high pair-count telephone cable (FIG. 1) has a core 12 made up of a plurality of conductors 10, illustratively of approximately 16 mils in diameter, namely 26 AWG; for metal conductors of this size, a covering layer of insulation 19 gives the individual conductors a total insulated diameter of 30 mils. Other sizes of conductors, i.e. 24 AWG, 22 AWG and 19 AWG are commonly used, for which the insulated-conductor outside diameters are 36, 46 and 65 mils, respectively.

Figure 2:
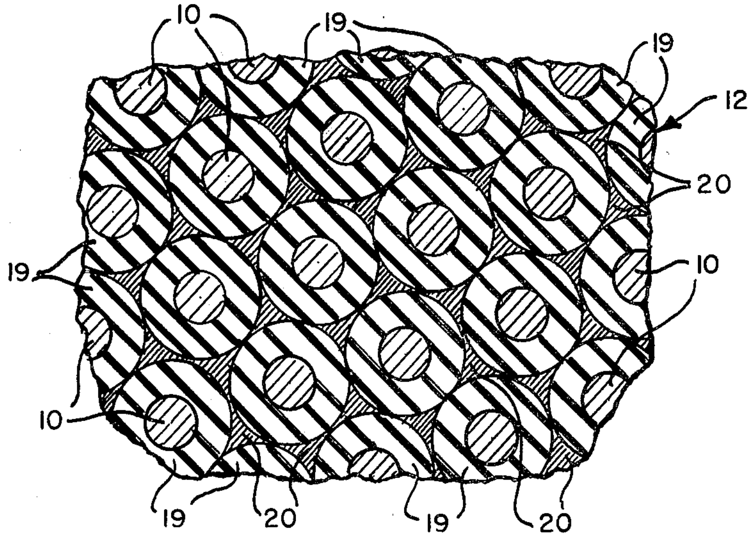
FIG. 2 is a greatly enlarged fragmentary view of a portion of FIG. 1.

The individual insulated conductors are of generally circular cross section with some distortion of their shape as the result of being crowded together as part of the cable core 12. The drawing shows a limited number of insulated conductors in detail but it will be understood that the entire cross section of the core 12 is similar to the portion shown in FIG. 2 in detail, and the conductors of the core are bound together in any of the conventional ways used for telephone cables.

In the construction illustrated, there is a layer of Mylar* 15 around the outside of the core 12, followed by a layer of aluminum 13. Outside of the layer of aluminum 13 there is a wrapping of steel 14, and beyond the steel 14 the cable has a plastic jacket 18. Other cable constructions are used with only one layer of metal or with a plastic jacket that holds the core together.

* DuPont trademark for polyethylene terephthalate

The drawing shows the type of telephone cable with which this invention can be used and it can also be used with simpler constructions which have lower pair counts and which therefore contain a smaller number of pairs in the telephone cable. The insulation 19 is usually solid or cellular types depending on cable design. The space between the insulation of adjacent conductors is filled with water-proof filling material to protect the individual insulated conductors 10 from moisture and so as to maintain an electrically uniform environment for the various insulated conductors 10 within the cable.

The filling compound 20 of this invention occupies any open space within the core and is bounded by the outside circumferences of the insulation 19 of the respective conductors 20.

Many different kinds of filler material have been used with telephone cables and it has been difficult to obtain filler material which has all of the characteristics desirable for their intended use. It is important that the filler material 20 be soft enough so that it does not make the cable too stiff. It is also important that the filler material have a drip point higher than any temperatures which the telephone cable will encounter in service. Breaks in the outer coverings of the cable can occur during service and it is important that the filler material never become liquid enough to flow through such breaks.

Other characteristics which the filler material should have include good electrical insulation; and tackiness so that filler 20 will adhere to the insulation on the wires 10 at all temperatures at which the cable is used and in spite of bending which may occur in the cable when in service.

Telephone cables are required to withstand a "bend test" which consists in bending a length of the cable to form a right angle with a specific radius at the vertex of the angle. The bend test is performed with the temperature of the cable at −40° C., and many fillers are hard enough to crack at such low temperatures.

The preferred embodiment of this invention includes 100 parts of a paraffinic type oil or a blend of such oils having Saybolt Universal viscosity of approximately 2500–3500 seconds at 100° F. (37.8° C.); five to ten parts of a polyethylene compound, with a melt index of 200 to 300 grams per ten minutes; one to two parts of polyisobutylene or a copolymer of polyisobutylene and isoprene; and 0.2 to 0.5 parts of a hindered phenolic type antioxidant.

EXAMPLE I

One example of the filling compound of this invention was made with 100 parts of paraffinic oil having a Saybolt Universal viscosity between 2500 and 3500 seconds at 100° F. (37.8° C.). This oil was mixed with 5 parts of polyethylene and 1 part of butyl rubber to which was added 0.2 parts of antioxidant. The solidification temperature of this mixture was a range from 76°

C. to 67° C. The melting range was 86° C. to 98° C. The mixture was not brittle at −40° C. and passed the bend test. The cup drip temperature was approximately 93° C. The filling compound was soft and had some tackiness.

EXAMPLE II

This second example was made with the same formula as the first example except that it used 7 parts of polyethylene instead of 5 and the amount of butyl rubber was increased from 1 part to 2 parts. The solidification temperature increased at both ends of its range by 2.50° C., that is from a range of 76° C. to 67° C. to the higher range of 78.5° C. to 69.5° C. The melting range increased somewhat less and was 87° C. to 99° C. Example II passed the cold bend test at −40° C. and the cup drip temperature was 95.

EXAMPLE III

A third example had the amount of polyethylene raised from 7 parts as in Example II to 9 parts for Example III. This increased the solidification temperature range to 81.5° C. to 70.5° C. in Example III from 78.5° C. to 69.5° C. in Example II, with the main peak of the solidification temperature unchanged at 73.5° C. for both examples.

The melting range of the filler was substantially unchanged, being 86.5° C. to 99° C. for Example III. The melting peak was 91° C. and 90.5° C. for Examples II and III respectively.

EXAMPLE IV

This example used 100 parts of paraffinic oil and the same amount of antioxidant. The amount of polyethylene used was 10 parts, that is twice as much as in Example I and the amount of butyl rubber used was 2 parts which was twice as much as in Example I. The solidification temperature range was 77° C. to 70° C. The melting range was 85° C. to 99° C. The filler compund was tacky and passed the cold bend test at −40° C. The temperature for the cup drip was 99° C., as compared to 93°, 95° and 97° C. for Examples I, II and III respectively. Solidification and melting peaks of Example IV were 73° C. and 90° C.

All of the examples given provided the necessary characteristics for the telephone cable. During manufacture of the cable the filler compound was applied as a liquid or semi-solid as core filling and in liquid form as overfill.

The preferred embodiment of the invention has been described, but changes and modifications can be made and some features can be used in different combinations without departing from the invention as defined in the claims.

What is claimed is:

1. In a high pair count telephone cable with small insulated conductors comprising the cable core including in combination a waterproof filler compound based on paraffinic type oil, the improvement in which the paraffinic type oil has a Saybolt Universal viscosity of approximately 2500–3500 seconds at 37.8° C., the paraffinic oil being 100 parts of the filler, and in which the remainder of the filler compund comprises approximately 5 to 10 parts of polyethylene mixed with ingredients from the group consisting of polyisobutylene, and a copolymer of polyisobutylene and isoprene, the filler compound being tacky at temperatures from −40° C. and having a drip point in excess of 71° C., and the filler compound being soft enough to withstand the telephone wire bend test at a temperature of approximately −40° C.

2. The improvement described in claim 1 characterized by an ingredient for increasing the surface tension of the filler compound and constituting at least one part of polyisobutylene.

3. The improvement described in claim 1 characterized by the ingredient for increasing the surface tension of the filler compound being a material from the group consisting of polyisobutylene and a copolymer of polyisobutylene and isoprene.

4. The improvement described in claim 2 characterized by the ingredient for increasing the surface tension being at least one part of a copolymer of polyisobutylene and isoprene.

5. The improvement described in claim 1 characterized by the polyethylene having a melt index of 200 to 300 grams per 10 minutes.

6. The improvement described in claim 1 characterized by the insulated conductors being insulated with polyolefin insulation, and the filler compound having reduced solubility and mobility with respect to the polyolefin insulation on the conductors.

7. The improvement described in claim 6 characterized by the polyolefin insulation being a cellular insulation and the filler compound containing a high molecular weight oil and having a surface tension that prevents the filler compound from filling the pores of the cellular insulation, thereby enabling a liquid filling of the cable with reduced swelling of the insulation and less extraction of copper inhibitor and antioxidant whereby the life of the insulation is increased in a pedestal environment.

8. The improvement described in claim 1 characterized by the tacky filler compound having good adhesion to the cable components within the temperature range from −40° C. to 71° C.

9. The improvement described in claim 1 characterized by the filler compound being flexible enough at −40° C. to withstand the telephone cable bending test of 90 degrees without cracking.

10. The improvement described in claim 1 characterized by the conductors of the cable core being of size in the range of 19 AWG to 26 AWG.

* * * * *